May 13, 1941.  J. P. SPANG  2,241,650
MEAT-SLITTING MACHINE
Filed Jan. 2, 1940  3 Sheets-Sheet 1

Inventor.
Joseph P. Spang
by Heard Smith & Tennant.
Attys.

May 13, 1941.  J. P. SPANG  2,241,650
MEAT-SLITTING MACHINE
Filed Jan. 2, 1940  3 Sheets-Sheet 3

Inventor.
Joseph P. Spang
by Heard Smith & Tennant
Attys.

Patented May 13, 1941

2,241,650

UNITED STATES PATENT OFFICE 2,241,650

MEAT-SLITTING MACHINE

Joseph P. Spang, Quincy, Mass., assignor to Cube Steak Machine Company, Inc., Boston, Mass., a corporation of Massachusetts Application January 2, 1940, Serial No. 312,009

4 Claims. (Cl. 146—98)

This invention relates to meat-slitting machines of that type which includes a set of rotary slitting knives, a bed over which the slice of meat to be slit is fed, and a feed roll for feeding the slice past the knives.

One object of the present invention is to provide an improved form of feed roll and improved means for mounting and driving the same by which the machine may be used either to cut slits in one surface of the meat or to cut entirely through a slice of meat, thus cutting it into strips.

A further object of the invention is to provide improved means for operating the feed roll from the knife shaft. Other objects of the invention are to improve generally meat-slitting machines in various particulars, as will be more fully hereinafter set forth.

In the drawings, wherein I have illustrated some selected embodiments of the invention:

Figure 1:
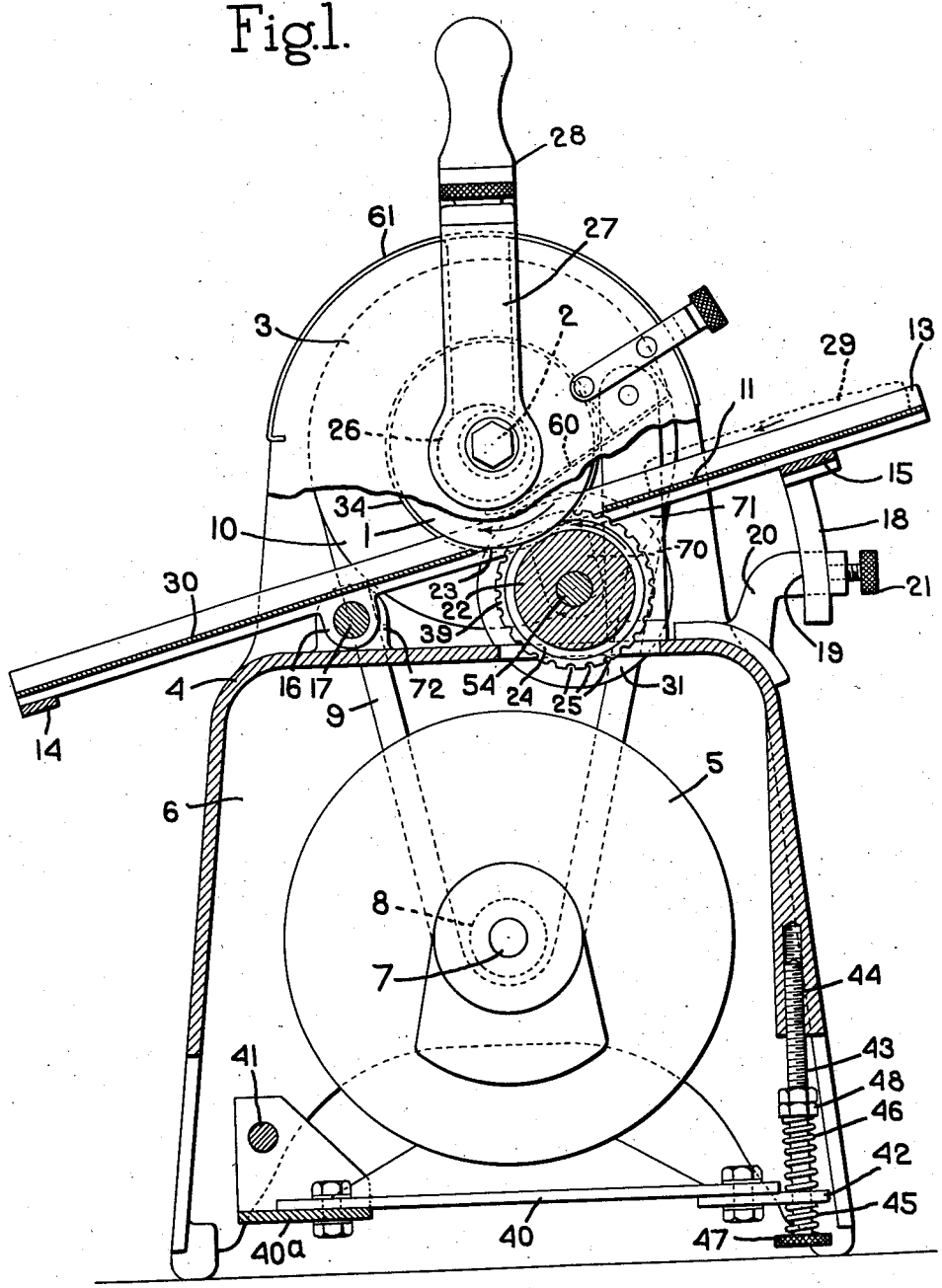
Fig. 1 is a side view partly in section showing a meat-slitting machine made in accordance with the invention.
Figure 2:
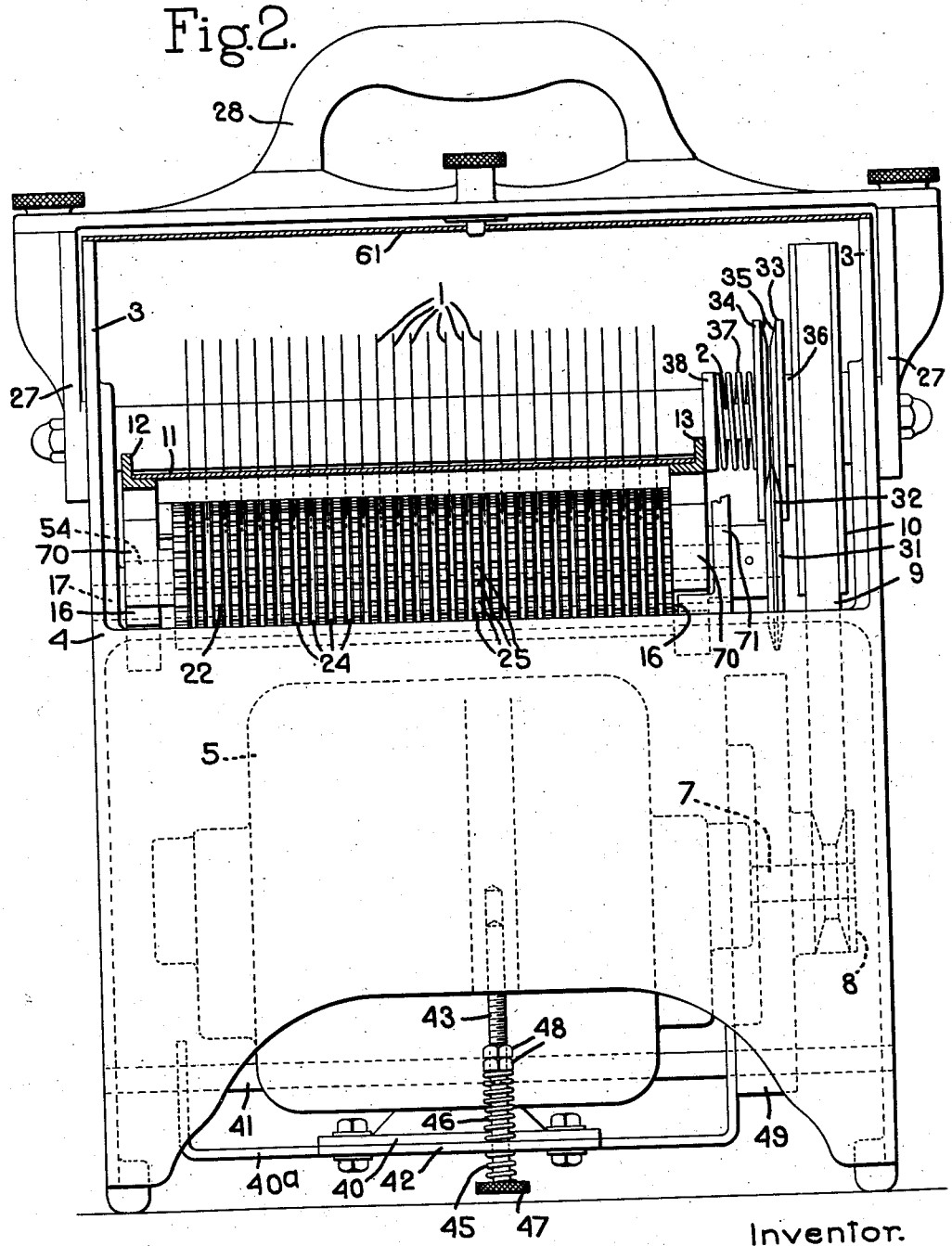
Fig. 2 is an end view, Fig. 1, with the meat-supporting bed shown in section.

The rotary knives by which the meat is slit are indicated at 1 in the drawings. These are rigidly mounted on a knife shaft 2 which is journaled in uprights or end pieces 3 of the frame 4.

The knife shaft 2 is driven from a suitable motor 5 which is located in a motor chamber 6 with which the frame 4 is provided. The motor shaft 7 has a driving pulley 8 thereon around which passes a driving belt 9 that has operative engagement with a pulley 10 on the knife shaft 2.

11 indicates a meat-supporting bed or platform over which the meat to be sliced passes. This platform is shown as carried by two angle iron side rails 12 and 13 which are suitably connected at their ends by cross-bars 14, 15. The bed 11 is pivotally mounted on the frame 4 so that it can be swung toward and from the knives, and to provide for this, the side rails 12 and 13 each have bearing portions 16 which receive a cross shaft 17 carried by the frame, said shaft 17 providing a pivotal axis for the side rails 12, 13 and the bed 11. This shaft 17 is mounted at one end in one of the uprights 3 and at the other end is supported in a boss 72 formed on the frame. Means are provided for holding the bed 11 in any adjusted position, and for this purpose, the cross-bar 15 is shown as having a depending arm 18 which extends through a slot 19 formed in a bracket member 20 secured to the frame, said arm 18 being locked to the bracket in any adjusted position by a set screw 21.

Mounted on the side rails 12 and 13 of the bed is a positively driven feed roll 22 which projects through an opening 23 formed in the platform or bed 11. This feed roll 22 is fast on a shaft 54 which is rotatably mounted in bracket arms 70 which depend from the side rails 12 and 13. This feed roll 22 is provided with a plurality of circumferential grooves 24, one for each knife 1, thereby forming a plurality of flat-faced circumferential ribs encircling the roll and it is also provided with a plurality of longitudinal grooves 25, which, however, are of less depth than the circumferential grooves 24.

The knife assembly 1 is mounted in the frame so that it can be adjusted in a vertical direction, and for this purpose, the ends of the knife shaft 2 are rotatably mounted in eccentric bushings 26 which, in turn, are mounted for rotation in the uprights 3 of the frame. These bushings 26 are connected to the lower ends of the arms 27 of a bail-shaped handle 28 so that when the handle 28 is swung forward or backward from the position shown in Fig. 1, the resultant turning movement of the eccentric bushings 26 will raise and lower the knives. This bail-shaped handle 28 and the eccentric bushings 26 as well as the means for supporting and adjusting the bed 11 provide means by which the knives and the feed roll may be relatively adjusted toward and from each other. In one adjusted position, that shown in Fig. 1, the knives 1 dip into the circumferential grooves 24, and with this adjustment, whenever a slice of meat (shown in dotted lines at 29 in Fig. 1) is moved downwardly over the bed 11 and in contact with the driven feed roll 22, which is rotating counterclockwise (it being understood that the knives 1 are rotating clockwise in Fig. 1), the action of the feed roll on the slice of meat will feed it past the knives, and because the knives are dipping into the grooves 24, said knives will cut clear through the slice, thus cutting it into strips which are deposited on the lefthand portion 30 of the bed 11.

Figure 3:
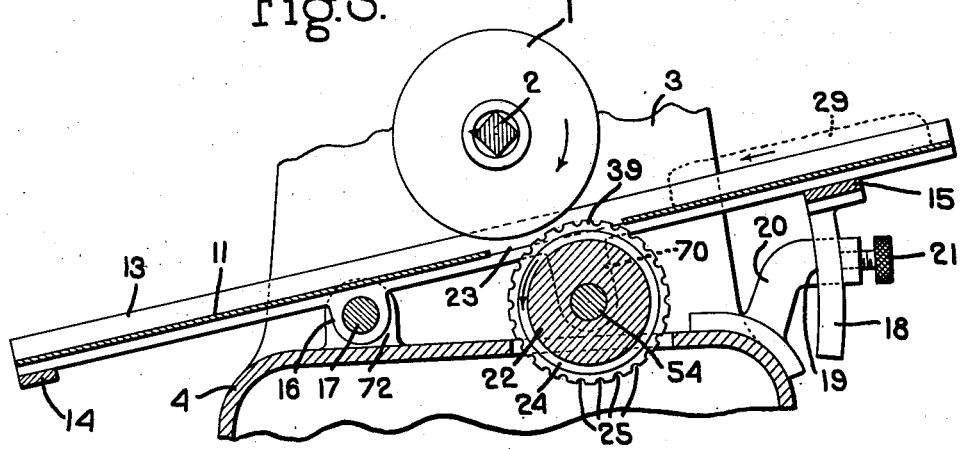
Fig. 3 is a fragmentary sectional view illustrating the knives and the feed roll adjusted for cutting slits in one face only in a slice of meat.

If the knives 1 and the feed roll 22 are adjusted relative to each other into the position shown in Fig. 3, in which the knives 1 are entirely withdrawn from the grooves 24, which adjustment may be secured either by lowering the bed 11 or by raising the knives 1, or both, then when a slice of meat 29 is placed on the bed and moved forwardly, and is fed past the knives by the feed roll 22, said knives will cut slits part way but not entirely through the slice because of the fact that the upper surface of the feed roll is spaced slightly below the knives.

The feed roll is driven from the knife shaft 2 by a driving connection which is operative in all relative adjusted positions of the knives and feed roll. This driving connection comprises a driven disk 31 on the shaft of the feed roll 22, which disk has a V-shaped peripheral portion 32 that is located between two driving disks 33, 34 on the knife shaft 2. The adjacent faces of these disks 33, 34 are beveled or inclined, as shown at 35. Both disks 33 and 34 are mounted on the shaft 2 to rotate therewith. The disk 33 is backed by a collar 36 fast on the knife shaft 2, while the disk 34 is backed by a suitable spring 37. The latter is confined between said disk and a collar 38 fixed on the knife shaft. The frictional engagement of the driving disks 33, 34 with the driven disk 31 will rotate the feed roll 22, and the operativeness of this driving connection will not be disturbed by adjusting the knife shaft and feed roll away from or toward each other.

Figure 4:
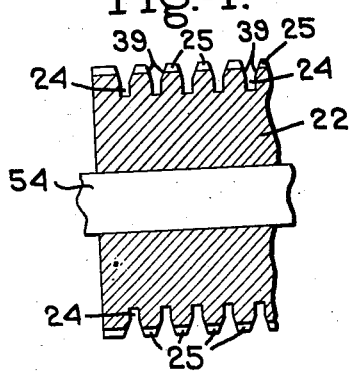
Fig. 4 is an enlarged fragmentary longitudinal sectional view through the feed roll.
Figure 5:
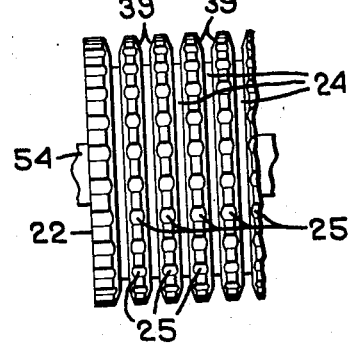
Fig. 5 is a side view of a portion of the feed roll.

The knives 1 are made of relatively thin sheet material, and if in cutting a slice of meat any knife encounters a hard or gristly portion, the knife is sometimes bent sideways slightly out of its true position. In order to provide a feed roll having the two sets of grooves which is free from any shoulders formed by the grooves with which a deflected knife might engage with disastrous results, I propose to make each circumferential groove 24 with the beveled throat, as best seen in Figs. 4 and 5. The outer peripheral portion of the side walls of each groove 24 are beveled somewhat, as shown at 39, and the bevel 39 is carried below the bottom of the longitudinal grooves 25. If, therefore, any knife becomes deflected laterally out of its true position, it will strike the beveled face 39 of the grooves 24 and will thus be guided back into its correct position, and during this time, there is no possibility that the knife will engage a sharp corner formed by the intersection of the longitudinal and circumferential grooves. The knives and feed roll may thus be freely adjusted toward and from each other into any desired position without danger that the knives will be injured by striking sharp right angular corners where the longitudinal and circumferential grooves intersect each other. The circumferential grooves 24 are relatively narrow and the beveled faces 39 are so disposed that each of the ribs formed between two adjacent grooves 24 has a flat outer face in which the longitudinal grooves 25 appear.

The motor 5 is provided with a base 40 which is secured at one edge to a supporting member 40a that is pivoted to the frame at 41. The other end of the motor base has an extension 42 secured thereto through which extends an adjusting screw 43, the latter having screw-threaded engagement with the frame as shown at 44. The adjusting screw 43 carries two cushioning springs 45 and 46, the spring 45 being located between the extension 42 and the head 47 of the screw, and the spring 46 being located between said extension 42 and adjustable collars or nuts 48 with which the screw is provided. The springs 45, 46 serve as cushioning springs to absorb vibration, and by adjusting the screw 43 upwardly or downwardly, the position of the motor can be adjusted, thereby applying the desired tension on the belt 9.

In slitting slices of meat, it is desirable that the slitting machine should operate at a relatively uniform speed. When a slice of meat is fed beneath the knives by the feed roller, the action of the knives in cutting the meat tends to slow down the speed of the machine, and this is especially true if the meat is tough or has gristly portions therein. Such slowing down of the speed of the machine will not be apparent if the motor which is used is heavy enough to carry the maximum load caused by cutting tough portions of the meat. However, a large motor is more expensive to run than a small motor which will be sufficient to operate the machine properly when cutting tender meat or a thin slice of meat. In order to provide a slitting machine which operates satisfactorily even when driven by a motor which of itself has insufficient power to maintain the speed of the knives when cutting tough or gristly meat, I propose to equip the motor with the flywheel 49 which is preferably shown as rigid with the motor pulley 8. With this arrangement, whenever any slice of meat is being cut which has some hard-to-cut portions that would tend to cause a reduction in the speed of rotation of the knives, the momentum of the flywheel comes into play to augment the power of the motor, thereby providing sufficient power to drive the knives through the tough or hard portion of the slice of meat. In cutting any slice of meat, the time interval during which the knives are acting on the meat is a relatively small one, as the slice moves from the receiving to the delivery end of the platform 11 in a short interval of time, and, therefore, the momentum of the flywheel will be sufficient to prevent the speed of the machine from being appreciably reduced even when the knives strike a tough portion of the meat.

Figure 6:
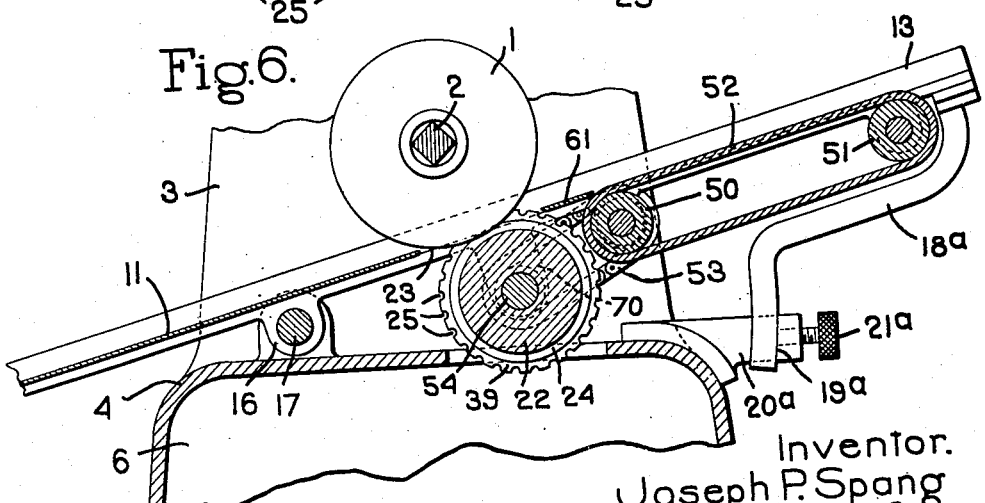
Fig. 6 shows a different embodiment of the invention wherein an endless apron is used for feeding the slice of meat to the knives.

In Fig. 6 I have illustrated an embodiment of the invention wherein an endless apron is provided for feeding the meat to the feed roll. In this embodiment of the invention, the side rails 12 and 13 are provided with two rolls 50 and 51 over which an endless apron 52 passes. The roll 50 is driven from the feed roll shaft 54 by means of a sprocket chain 53 which passes around the sprocket wheels on said roll 50, and said shaft 54 respectively. In other respects, the invention shown in Fig. 6 is similar to that illustrated in the other embodiments of the invention.

The supporting member 40a, the motor base 40 and the extension 42 may be considered as a platform on which the motor is supported.

While I have illustrated herein some selected embodiments of my invention, I do not wish to be limited to the construction shown.

I claim:

1. A meat-slitting machine comprising a frame, a knife shaft rotatably carried thereby, a set of rotary slitting knives mounted on said shaft, means to rotate the knife shaft, a meat-supporting bed over which a slice of meat may be carried past the knives, a feed roll beneath the knives and mounted with its upper surface projecting partially through the bed, said feed roll having a plurality of circumferential grooves, one for each knife, means for relatively adjusting the knives and the feed roll between a relative position in which the knives dip into said grooves of the feed roll and a relative position in which the upper surface of the feed roll is below the knives, means for maintaining the knives and feed roll in any adjusted relative position during operation of the machine, and a direct frictional driving connection between the knife shaft and the feed roll by which the latter is rotated from the former, said driving connection being operative in all relative adjusted positions of the knives and feed roll.

2. A meat-slitting machine comprising a frame, a set of rotary slitting knives carried thereby, means to rotate the knives, a meat-supporting bed over which a slice of meat may be carried past the knives, a feed roll associated with said bed and having its upper surface projecting partially through the bed, said feed roll having a plurality of circumferential grooves, one for each knife, means for adjusting the bed toward and from the knives, and a driving connection between the knives and the feed roll by which the latter is rotated from the former, said driving connection comprising a pair of driving disks coaxial with the knives and rotating therewith and a driven disk coaxial and rigid with the feed roll and operating between the driving disks, and yielding means to hold the driving disks in frictional engagement with the driven disk.

3. A meat-slitting machine comprising a frame, a knife assembly including a knife shaft rotatably mounted in the frame and a plurality of disk knives carried thereby, means to rotate the knife shaft, a meat-supporting bed for carrying the slice of meat to be slit past the knives, a feed roll associated with the bed and having its upper surface projecting partially through said bed, said feed roll having a plurality of circumferential grooves, one for each knife, means for adjusting the bed and feed roll vertically relative to the knives, a pair of driving disks mounted on and rotating with the knife shaft, a driven disk coaxial and rigid with the feed roll, said driven disk operating between the driving disks, and spring means for maintaining the driving disks in yielding frictional contact with the driven disk.

4. A meat-slitting machine comprising a frame, a knife shaft rotatably carried thereby, a set of rotary slitting knives mounted on the shaft, means to rotate the shaft, a meat-supporting member pivotally mounted on the frame to turn about an axis at one side of the knife shaft, a meat-supporting bed carried by said member over which a slice of meat may be fed past the knives, a feed roll journaled in said member beneath the bed but having its upper surface projecting partially through said bed, said feed roll having a plurality of circumferential grooves, one for each knife, turning movement of the meat-supporting member about its pivotal axis providing for relatively adjusting the knives and the feed roll between a relative position in which the knives dip into said grooves of the feed roll and a relative position in which the upper surface of the feed roll is below the knives, means for locking the meat-supporting member in any adjusted position, and a direct frictional driving connection between the shaft and the feed roll by which the latter is rotated from the former, said driving connection being operative in all relative adjusted positions of the knives and the feed roll.

JOSEPH P. SPANG.